Dec. 26, 1967 TAKASHI ISHIDATE 3,360,785
SEMI-PERMANENT MEMORY SYSTEM
Original Filed April 19, 1963 3 Sheets-Sheet 1

INVENTOR.
TAKASHI ISHIDATE

BY

OSTROLENK, FABER, GERB & SOFFEN
ATTORNEYS

INVENTOR.
TAKASHI ISHIDATE
BY
OSTROLENK, FABER, GERB & SOFFEN
ATTORNEYS

United States Patent Office 3,360,785

Patented Dec. 26, 1967

3,360,785

SEMI-PERMANENT MEMORY SYSTEM

Takashi Ishidate, Tokyo, Japan, assignor to Nippon Electric Company Limited, Tokyo, Japan, a corporation of Japan Continuation of application Ser. No. 274,088, Apr. 19, 1963, now Patent No. 3,253,267, dated May 24, 1966. This application Mar. 7, 1966, Ser. No. 532,128
Claims priority, application Japan, Apr. 25, 1962, 37/16,939
2 Claims. (Cl. 340—173)

The instant invention relates to means for converting patterns in semi-premanent memories into electrical signals, and more particularly to an improved method for such conversion operations over the method and structure set forth in co-pending U.S. patent application Ser. No. 201,680 entitled, "A Converter for Converting a Semi-Permanent Memory Into an Electrical Signal," filed June 11, 1962 now U.S. Patent 3,231,874, by Takashi Ishidate and assigned to the assignee of the instant invention, and is a continuation of copending application Ser. No. 274,088, filed Apr. 19, 1963, now U.S. Patent No. 3,253,-267 and assigned to the assignees of the instant invention.

Memory of storage means provided in electronic computers are one of the most basic and essential elements contained therein. Memories are adapted to store both numbers to be processed and instructions which run the computer automatically. As computing operating speeds increase, it becomes necessary to be able to withdraw data in the form of signals from the memory as quickly as possible in order to speed up overall computer operating times. Memories broadly fall into two basic categories; the permanent memory and the temporary (i.e., erasable) memory. Permanent memory is that type in which, when data is inserted therein, there exists no means for altering the data stored therein instantaneously in order that it be replaced by new data. Memory units which fall into this category consist of diode matrices, ferrite-rod memory, card capacitor memory, and the like. The temporary (i.e., erasable) memories are those types of memories into which data may be inserted and, unless altered, will remain stored in the memory for indefinite periods. However, the status of the memory may be altered steadily and instantaneously simply by the insertion of new data which is coupled with the act of erasure of the data stored previous to the new data being inserted. Memory units falling into this category are comprised of magnetic core matrices, magnetic drums, magnetic tape units, and the like. While it is highly desirable to have a temporary or erasable memory so that no longer needed data may continuously be replaced by new data, in many instances it is found that certain types of data such as the programming information or data in the form of constants, and the like, which are used continuously throughout calculations performed by the computer, may very readily be stored in the permanent memory units.

Although such permanent memory units have the disadvantage in that it is possible to change the stored information at a rapid rate, the permanent memory nevertheless is a powerful solution to the problem of shortening access time for the memory unit.

One specific approach to the permanent memory unit is set forth in the copending U.S. application Ser. No. 201,680 mentioned above, and further set forth in the article entitled, "Eddy Card Memory—a Semi-Permanent Storage," by Ishidate et al., appearing in the publication entitled "Computers—Key to Total Systems Control" published by Macmillan Company of New York for the "1961 Proceedings of the Eastern Joint Computer Conference," held in Washington, D.C., and appearing in that publication on pages 194–208. The permanent (or semi-permanent) memory described in the above mentioned U.S.

patent application and "Eastern Joint Computer Conference" proceedings mentioned above is comprised of drive winding means and sense winding means which are orthogonally positioned relative to one another such that when current is passed through the drive winding means, due to the orthogonal relationship between the drive and sense winding means, there is no inductive coupling between drive and sense windings. However, by proper positioning of sheet-like conductive means in close proximity to both drive and sense winding means, currents will be induced into the sense winding means due to the eddy currents developed in the sheet-like conductive means by selectively positioning or removing such sheet-like conductive means at a plurality of such intersections between drive and sense windings, the present of such eddy current-producing means which induces a current into its associated sense winding, is recognized as a binary one condition, whereas the absence of such eddy current producing means which prevents any inductive coupling from existing between orthogonally related drive and sense winding means is recognized as a binary zero condition. Thus, by appropriate physical arrangement of such drive and sense winding intersections, it is possible to design card means which is provided with a plurality of such eddy current producing means at selected intersections such that when one of the drive windings is driven, only selected ones of such sense windings will generate output currents so as to be representative of the binary ones and binary zeros stored in said card means. In the preparation of such cards, one approach has been to provide conductive coatings at selected positions upon said cards, which coatings may be formed by etching processes in order to obtain the desired results. Such approaches, however, have been found to be rather tedious and expensive.

The arrangement of the instant invention, while using the same eddy current principles, employs a totally different approach from that of the copending application mentioned above, while, at the same time, providing a circuit with results which are superior to the results obtained by the structures of the above mentioned copending application.

The instant invention is comprised of orthogonally positioned drive and sense winding means having sheet-like conductive means positioned in close proximity to the orthoganally positioned windings, enabling the generation of eddy currents within such sheet means when current is driven through the drive windings. The physical configuration of the eddy current carrying means is such that, although eddy currents may be developed therein, the eddy current paths are such that no currents are induced in the sense or output windings of the device, such that this condition is interpreted as a binary zero condition. However, by forming an aperture of specific dimensions and having locations relative to the orthogonally aligned drive and sense windings, the eddy currents which result in the eddy current carrying means under such conditions are so arranged and aligned that the drive and sense windings, which may also be identified as the input and output windings, are thereby electromagnetically coupled due to the eddy currents flowing in the conductor piece. It thereby becomes possible to provide a single eddy current carrying sheet-like means which may be positioned adjacent to a plurality of such orthogonally related input and output windings such that binary one conditions may be provided at selected ones of said plurality of intersections simply by providing an aperture in the conductive sheet at predetermined locations thereof wherein such apertures have predetermined configurations and predetermined physical locations relative to their associated intersecting input and output windings.

A variety of apertures of differing configurations and physical locations relative to their associated intersecting input and output windings are possible so as to obtain a respective variety of output currents of varying magnitudes in order to provide utterly distinguishable signal levels for binary ONE and binary ZERO conditions. As an alternative embodiment, the use of such varieties of aperture configurations also permits the possibility of obtaining a variety of output signals of varying magnitudes, each one being distinguishable from the other so that such memory systems may be employed in systems other than binary systems such as ternary systems, for example.

It is therefore one object of the instant invention to provide a memory means employing eddy currents for magnetically coupling input and output windings of the memory device.

Still another object of the instant invention is to provide semi-permanent memory means which may be interpreted regarding its contents by means of orthogonally related input and output windings.

Still another object of the instant invention is to provide semi-permanent memory means which may be interpreted as to its contents by orthogonally related input and output windings positioned in close proximity to said memory means where said memory means constitutes a flat sheet capable of carrying eddy currents.

Still another object of the instant invention is to provide semi-permanent memory means which may be interpreted as to its contents by orthogonally related input and output windings positioned in close proximity thereto wherein said memory means constitutes a flat conductive sheet and wherein data is stored or pressed into said sheet by means of suitably positioned apertures.

These and other objects of the instant invention will become apparent when reading the accompanying descriptions and drawings, in which.

Figure 1:
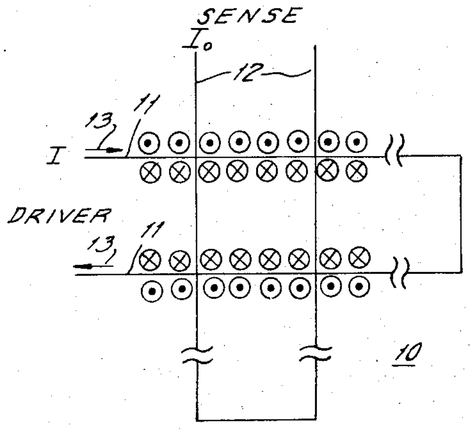
FIGURE 1 is a schematic diagram provided for the purpose of describing the principles of the instant invention.
Figure 2:
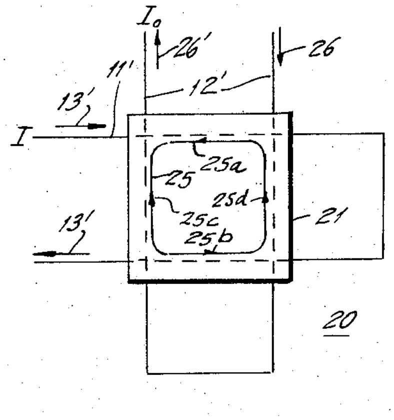
FIGURE 2 is a schematic diagram of one preferred embodiment of the invention described in my copending U.S. application Ser. No. 201,680.

Referring now to the drawings: FIGURES 1 and 2 show the principles of the semi-permanent memory means of the type described in the aforementioned U.S. Patent application Ser. No. 201,680. In FIGURE 1 the arrangement 10 is comprised of a driver, or input winding, 11 arranged in a loop or U-shaped manner. The reading sense, or output winding, 12 is likewise a U-shaped or loop output winding arranged as shown in FIGURE 1, and further positioned so that it intersects the driver or input winding 11 at right-angles. Assuming that the drive wires 11 are located at the address at which the data is to be read-out from, a current I is impressed through drive winding 11 in the directions shown by the arrows 13. In accordance with the "right-hand rule," the current I flowing through the driver winding 11 sets up a magnetic field surrounding the drive winding 11 in the manner schematically as shown in FIGURE 1 wherein the circles with dots represent field lines coming out of the plane of FIGURE 1 and the circles containing X's represent field lines entering into the plane of FIGURE 1. Since the drive and sense windings 11 and 12, respectively, are orthogonally related, as shown in FIGURE 1, there is no inductive coupling between these windings, and therefore, no read-out voltage or current is produced in the read-out winding 12, due to the presence of the driving current I in driver winding 11.

Considering now the arrangement 20 of FIGURE 2, similar drive windings 11′ and sense windings 12′ are provided therein, together with a flat conductive piece 21 which is positioned in close proximity to the drive and sense windings 11′ and 12′, respectively, so that it virtually "covers" the four intersections which the drive windings 11′ makes with the sense winding 12′. When a current I is passed through drive winding 11′ with the direction of current I being shown by arrows 13′, this causes an eddy current 25 to be produced in the conductor piece 21 with the direction of the eddy current being shown by the arrows around the eddy current loop. It should be noted that the eddy current portions **25*a* and 25*b* being substantially orthogonally positioned relative to sense winding 12′, provide no magnetic coupling therebetween. However, eddy current portions 25*c* and 25*d*, which are positioned substantially parallel to the leg of sensor output winding 12′, cause a current $I_0$ to be induced in the output windings 12′ with the direction of the current being shown by the arrows 26, 26′. Thus, using the concepts of FIGURES 1 and 2 in a selective manner, the presence of such a conductor piece 21 adjacent the intersection between drive and sense windings 11′ and 12′ will be designated as a binary one condition, whereas the absence of such a conductor piece at the intersection of drive and sense windings 11 and 12** such as is shown in FIGURE 1 is designated as a binary ZERO condition.

Figure 3:
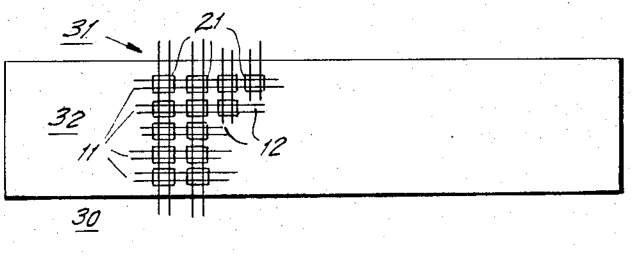
FIGURE 3 is a plan view of a memory card which may be employed in the semi-permanent memory of FIGURE 2.

By employment of these principles, an entire matrix may be formed in the manner shown in FIGURE 3, wherein the circuit 30 is comprised of a plurality of horizontally aligned drive windings 11 intersecting with the vertically aligned sense windings 12 to form a plurality of intersections, as shown therein. In order to provide desired signals at the output windings, this may be simply done by selectively positioning the plurality of such conductor pieces 21 in close proximity to the desired intersecting drive and sense windings, thereby having an arrangement which will produce the desired output signals in the sense windings upon energization of the drive windings. As an alternative to such an arrangement, the arrangement 30 of FIGURE 3 provides a card 31 known as an "Eddy Card" upon which the desired conductor pieces 21 may be selectively positioned in the manner show in FIGURE 3. The "Eddy Card" is so named because it is a memory card for a semi-permanent memory wherein eddy currents are utilized therein.

The conventional eddy card comprises a base plate 32 for printed circuits with the printed conductor pieces 21 at positions corresponding to crossing points of the drive and sense windings. By utilization of the card in the form described, binary ONE information is contained wherever a conductor piece 21 is present, while binary ZERO information is contained wherever a conductor piece is absent. Such eddy cards may be "written into" by preparing such cards so that all positions on this card associated with a drive and sense winding intersection is provided with a conductive coating, and by chemically or mechanically removing such conductive coatings, binary ZEROS may then be stored upon the eddy card 31.

The conventional eddy card has the disadvantage that the necessary of accurate arrangement of the conductor pieces 21 on the base plate 32 is a tedious undertaking involving substantial expense both from the viewpoint of materials and manufacturing processes. By employment of the instant invention, the eddy card utilized therein is comprised of only a conductor plate, as opposed to a plurality of conductor plates provided on an insulating substrate such that the expense of preparation and materials is substantially reduced and the results obtained are also superior to that of the device shown in FIGURES 1–3.

Figure 4:
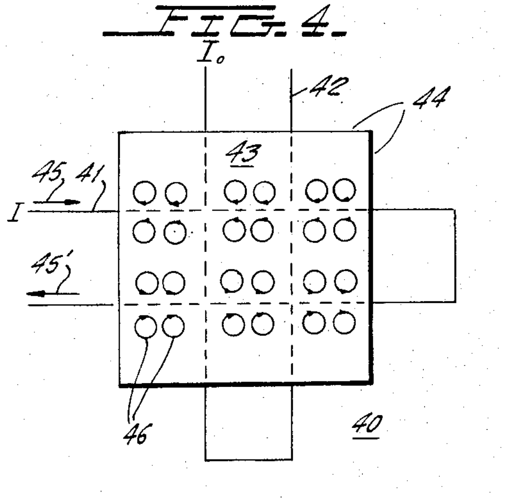
FIGURES 4 and 5 are schematic diagrams of the semi-permanent memories designed in accordance with the principles of the instant invention, and further provided for the purpose of explaining the method for storing a binary ZERO in the memory means.

Referring now to FIGURE 4, the arrangement 40 shown therein is comprised of drive and sense windings 41 and 42 arranged in substantially the same manner as the drive and sense windings of FIGURES 1–3. A conductor plate 43 is provided which is positioned in close proximity to the drive and sense windings 41 and 42, so that it substantially "covers" the four intersections between the drive and sense windings 41 and 42. It should be noted that the dimensions of conductor piece 43 and substantially greater than the dimensions of conductor piece 21 provided in FIGURE 2 so that the perimeter 44 of conductor piece 43 extends well beyond the drive and sense windings in the region of the intersections thereof, and is itself of significantly large area.

When a current I is passed through drive winding 41 with the direction of current being shown by the arrows 45 this driving current generates the eddy current shown by the small current loops 46 in the conductor piece 43. It can clearly be seen that the current directions of sections of the eddy current loops 46 which are adjacent one another cancel one another out. This cancellation thereby provides the resultant eddy current loops 47′, 48′, and 49′, shown in the embodiment 40′ of FIGURE 5, which is substantially identical to the embodiment of FIGURE 4 with the exception of the fact that the resultant eddy current loops are shown in FIGURE 5, which resultant loops are generated by the individual small eddy current loops 46 of FIGURE 4.

The current legs or portions 50′, 51′, 52′, 53′, 54′ and 55′ are so aligned that they orthogonally cross or intersect sense winding 42′, and hence do not induce any current in the sense or read-out winding 42′. The current portions or legs 56′, 57′, 58′, 59′, 60′ and 61′, while being in substantially parallel alignment with the sense winding 42′, will not induce significant current along the sense winding 42′ because they are sufficiently remote in location from the sense winding 42′.

This thereby means that the driving and sense, or read-out windings 41′ and 42′ have no mutual electromagnetic coupling, not only when left as they are, but also even if served by the conductor plate 43′ in the case where the conductor plate is of sufficiently large area compared with the area formed at the four intersections of the driving and read-out windings 41′ and 42′.

Figure 5:
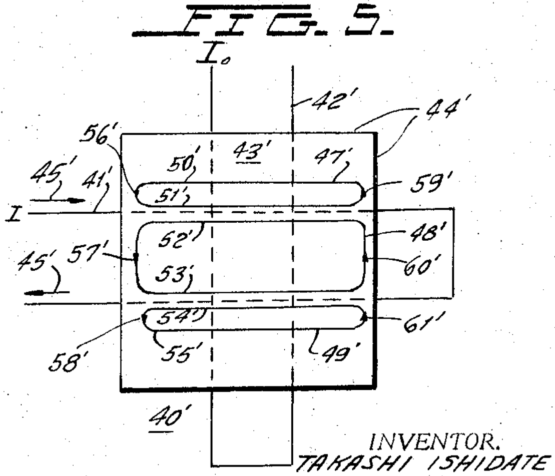
Figure 6:
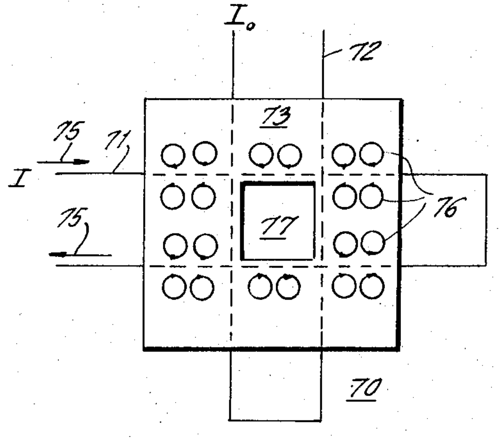
FIGURES 6 and 7 are schematic diagrams of the memory device of the instant invention in the form showing the manner of storing a binary ONE condition.
Figure 7:
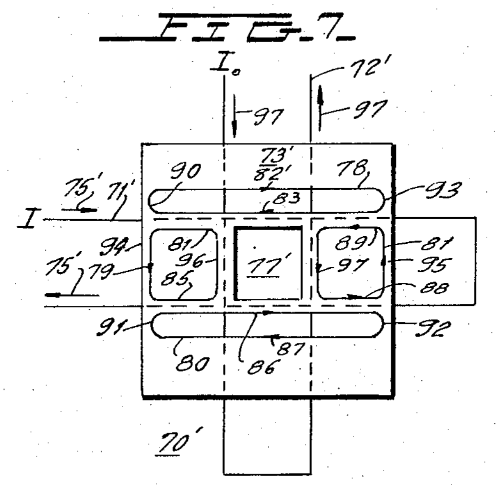

Turning now to FIGURES 6 and 7, identical embodiments 70 and 70′ are shown therein, wherein considering first mebodiment 70, the circuitry is comprised of drive winding 71 and sense winding 72 having a conductor piece 73 positioned in close proximity thereto, wherein the overall dimensions of conductor piece 73 has substantially the same overall dimensions as to the conductor pieces 43 and 43′ in FIGURES 4 and 5, respectively. The conductor piece 73, however, differs from the conductor pieces 43 and 43′ of FIGURES 4 and 5 in that it is provided with a substantially rectangularly shaped aperture 77 which is centrally located and which is positioned so that it lies substantially within the portions of the drive and sense windings which intersect one another, as can clearly be seen in FIGURE 6. When a current I is passed through drive winding 71 with the current direction being given by the arrows 75, this again induces the small eddy current loops 76 throughout the conductor piece 73. As was the case in FIGURE 4, adjacent portions of eddy current loops which are opposite in sense tend to cancel one another so as to form the resultant eddy current loops 78, 79, 80 and 81, as shown in FIGURE 7. The current legs or portions 82–89 of these current loops 78–81, being substantially perpendicularly positioned relative to sense winding 72′, do not magnetically couple sense winding 72′. The current legs or portions 90–95 of current loops 78–81, while being substantially parallel to sense winding 72′, are significantly far enough away from sense winding 72′, so as to make no electromagnetic coupling contribution between the conductor piece 73′ and the sense winding 72′.

However, the current portions or legs 96 and 97 of current loops 79 and 81, respectively, lie in very close proximity to the sense winding 72′, and are substantially parallel thereto so as to induce a current $I_0$ in sense winding 72′ in the direction shown by the arrows 97. Thus, it can be seen that the same results (i.e., no electromagnetic coupling) as obtained in FIGURE 1 is obtainable with the arrangement of FIGURE 4 which employs a conductor piece and again the same result (i.e. conductive coupling between sense and drive windings) as is obtained in FIGURE 2 of the drawings is obtained with the arrangement of FIGURES 6 and 7 of the drawings simply by providing an aperture of suitable dimensions in the conductor piece so as to induce the significant eddy current leg portions 96 and 97, as shown in FIGURE 7.

Figure 8:
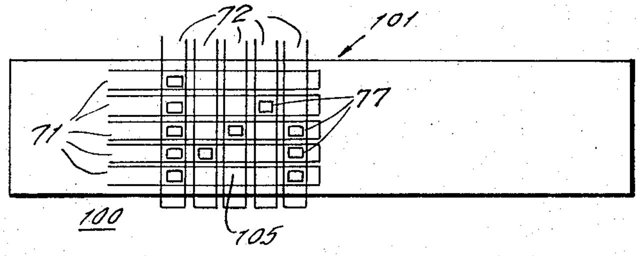
FIGURE 8 shows a memory card designed for use in the system of the instant invention.

The arrangements of FIGURES 4–7 greatly simplify the design of the eddy card such as, for example, the eddy card 101 used in the arrangement of FIGURE 8. As shown therein, the system 100 is provided with a plurality of driving windings 71 arranged substantially parallel to one another and which are orthogonally positioned relative to a plurality of sense windings 72, so as to form a regular matrix of the type shown in FIGURE 8. It should be understood that the matrix is substantially flat so that the eddy card 101 may be placed in close proximity and in parallel relationship therewith. The eddy card 101 is then appropriately positioned, and is provided with apertures 77 at selected locations thereof in order to "store" binary one conditions at these locations. The preparation of the eddy card 101 is a relatively simple task in that it may be a flat, conductive sheet of suitable material which is appropriately punched or slotted at the selected positions associated with the drive and sense winding intersections of the matrix in order that the matrix, when the eddy card is suitably positioned adjacent thereto, may correctly interpret the data stored in the eddy card 101 and may convert this data into suitable electrical signals. It should be understood that any intersections such as, for example, the intersection 105 at which no aperture is provided, results in a binary ZERO stored condition due to the fact that no electromagnetic coupling exists between the drive and sense windings 71 and 72 due to the fact that the conductive eddy card 101 of FIGURE 8 operates in the same identical manner as the conductor piece 43 of FIGURE 4. While the eddy card 101 is greater in dimensions than the conductor piece 43 this is immaterial so long as the eddy card 101 is at least as great in size as the conductor piece 43 of FIGURE 4.

Comparison of the eddy card 101 of the instant invention with the eddy card 31 of FIGURE 3 makes it evident that the eddy card for use in the converter of the instant invention is vastly more economical since it only requires a conductor plate and no insulating substrate, and further since it does not require any specific technique for the formation of the apertures as is required in the printing and/or etching techniques for the provision of conductor pieces on the eddy card substrate 32 of FIGURE 3.

As an alternative embodiment to the eddy card 101 of FIGURE 8, an arrangement may be used whereby a punch card such as, for example, an IBM punch card is provided with one surface thereof containing a metallic coating. The punch card may then be punched or perforated in the same identical manner as is done presently whereby such perforators or punch means (not shown) will pierce the conductive coating affixed to the punch card together with the punch card itself, thereby providing a binary one condition at each location at which a perforation is made. Such punch cards containing such conductive coatings may then be employed in the same manner as present day punch cards with the electrical converted means of the instant invention making interpretation and reading of such punch cards occur at rates faster than any present day devices.

Figure 9:
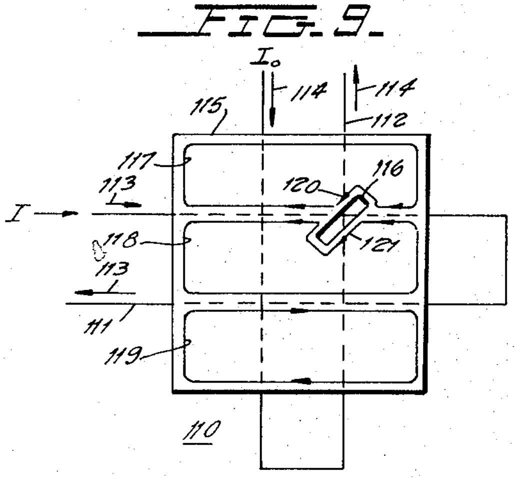
FIGURE 9 shows an alternative embodiment to that of FIGURES 4 and 7 for storing a binary ONE condition in the memory means.

Referring now to FIGURE 9, there is shown therein a circuit arrangement 110 which is an alternative embodiment to that of FIGURES 4–8 and is comprised of drive windings 111 and orthogonally aligned sense windings 112. A conductor piece 115 is positioned adjacent the windings 111 and 112 in the same manner as previously described. When a current I is impressed in the drive windings 111 in the direction shown by arrows 113, this induces the resultant eddy current loops 117, 118 and 119 in the conductor piece 115. As can be noted, the conductor piece 115 is provided with a diagonally aligned elongated aperture 116 which, due to its dimensions and location, causes the current loop portions 120 and 121 of current loops 117 and 118, respectively, to be diagonally aligned, as shown in FIGURE 9. These current portions 120 and 121, forming a substantially 45° angle with sense winding 112, each may be broken down into horizontal and vertical magnetic force components such that each vertical component will make electromagnetic coupling with the conductor 112 to generate a current $I_0$ in the sense winding 112.

Figure 10:
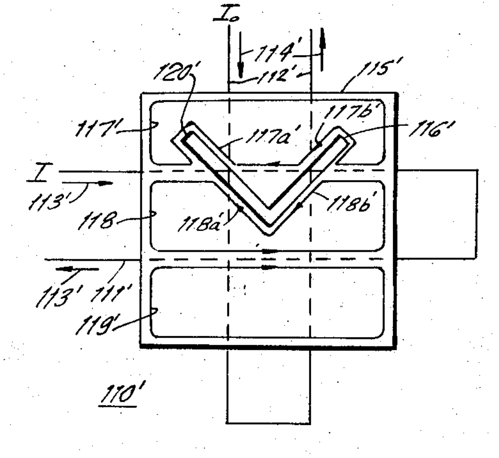
FIGURES 10 through 13 are schematic diagrams showing other alternative embodiments for providing binary ONE storage conditions in the memory means of the instant invention.

Still another alternative embodiment 110′ is shown in FIGURE 10 which is substantially identical to the alternative embodiment 110 of FIGURE 9, with the exception that a substantially V-shaped slot 116′ is formed in the conductor piece 115′ such that when the eddy current loops 117′ and 118′ and 119′ are formed, due to the presence of a drive current in drive winding 111′ in the direction shown by arrows 113′, the portions **117*a*′ and 117*b*′ of current loops 117′, 118*a*′ and 118*b*′ of eddy current loop 118′ substantially form a 45° angle with the sense winding 112′ and each may be considered to be broken into a horizontal and vertical force component so as to electromagnetically couple the sense winding 112′ in order to generate an output current $I_0$ in the sense winding 112′ in the direction shown by arrows 114′**.

With the V-shaped aperture, it is possible to obtain an output current $I_0$ having a magnitude which is twice that obtainable by the diagonally aligned aperture 116 provided in the embodiment 110 of FIGURE 9.

Figures 11, 12, 12A, 13:
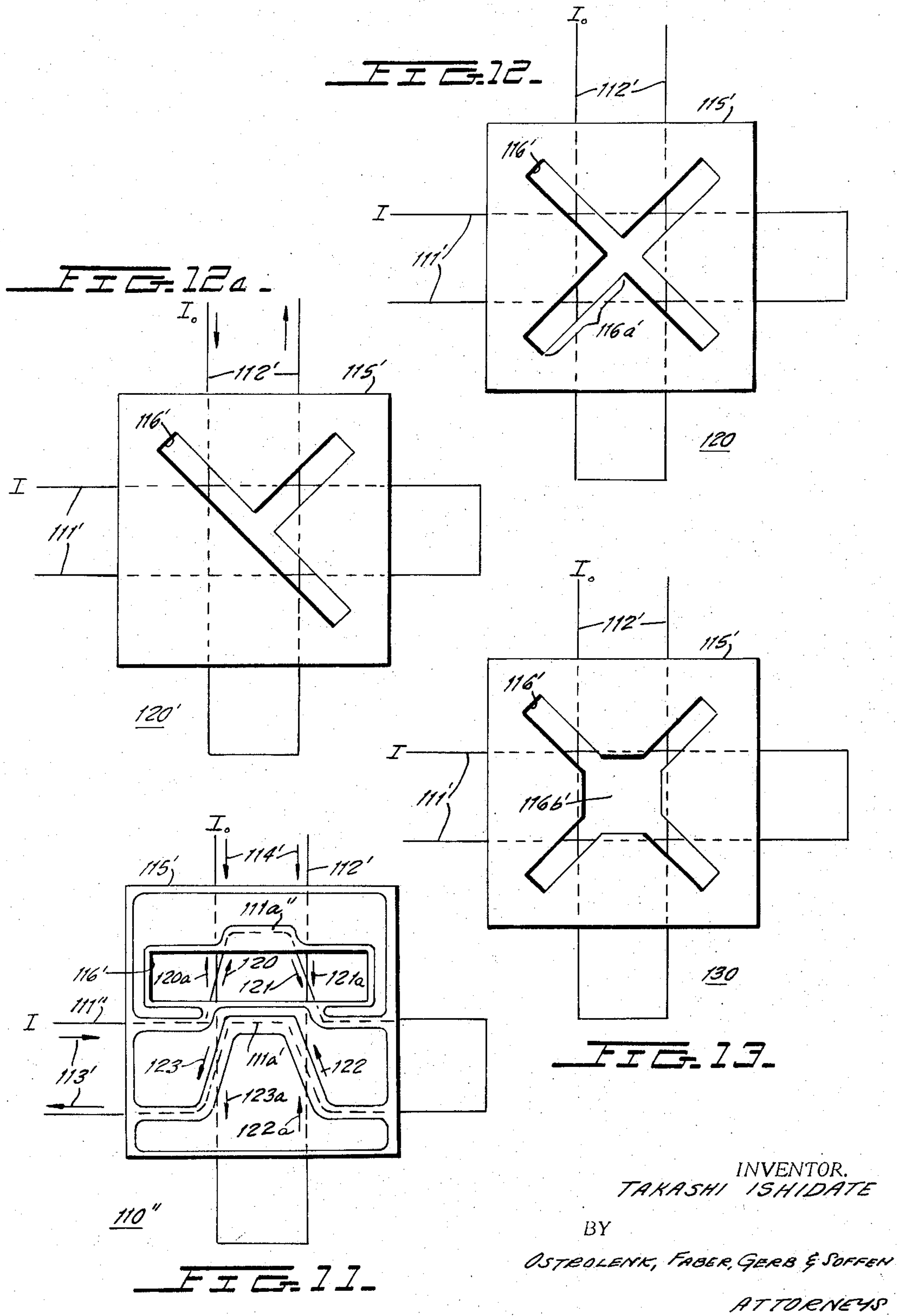

The embodiment 110″ is comprised of a drive winding 111″ having two "humps" such as can be seen in FIGURE 11, to cross, in a diagonal fashion, the conductor piece and which operates in the following manner:

Let it be assumed that the drive winding 111″ has a current I impressed therethrough. At the locations where the drive winding 111″ intersects the sense winding 112′, the current vectors are shown by the arrows 120, 121, 122 and 123 having vertical components **120*a*–123*a*, respectively, parallel to the sense winding 112′, causing a current to be induced therein. However, it should be noted that the current vectors 120*a* and 123*a* are in the reverse directions in the left-hand leg of sense windings 112′, tending to cancel one another, and likewise with the components 121*a* and 122*a* being in opposite directions, they tend to cancel one another, since between drive and sense windings 111″ and 112′ respectively, no output current is induced in the sense winding 112′**.

Considering now the placement of conductor piece 115′ in close proximity to the drive and sense windings in the manner shown in FIGURE 11, the eddy current loops set up in the conductor piece 115′ tend to provide better electromagnetic coupling at the intersections where the current vectors 122 and 123 lie, and to diminish the electromagnetic coupling at the intersections where the vectors 120 and 121 lie, so as to produce output current $I_0$ in the sense winding 112′. This modification enables the same effect as produced by the arrangement of FIGURE 10 to be attained as regards an increase in the output signal. Where an aperture, as indicated by 116′ may be used it is possible to adopt an eddy card in the form of an IBM-type punch card aligned along one side thereof with a conductor plate having the same dimensions as the card, or a conductor plate per se having the same general dimensions as the card. Such a conductor combined with a punch card or a conductor per se may be punched in the same manner as is a general purpose punch card and be utilized in the same manner as previously described, but may be operated on, due to the circuitry of the instant invention, at speeds never before possible with present day devices.

FIGURE 12 shows still another alternative embodiment 120 in which the thin, elongated, rectangular-shaped aperture 116 of FIGURE 9 has been replaced by substantially X-shaped aperture 116′ which is so arranged that it overlies each one of the four intersections between drive and sense windings 111′ and 112′, respectively. With such an arrangement, it is possible to obtain an output current $I_0$ having a magnitude which is four times greater than that obtained with the use of the aperture 116 provided in the embodiment 110 of FIGURE 9. Considering the embodiments of FIGURES 9 and 12 which show an overlying of the apertures in the conductor pieces which involve first one, and then four, intersections between the drive and sense windings, it should be understood that any other number therebetween may be utilized such as the V-shaped aperture which overlies two intersections, as shown in FIGURE 10, and a third possibility being a substantially T-shaped aperture which overlies three of the four intersections which can be realized, considering FIGURE 12*a* the X-shaped aperture of FIGURE 12 forms the T-shaped aperture of FIGURE 12*a* by removal of any one of the legs such as, for example, the leg **116*a*′**. It should also be understood that the apertures may overlie any selected group of the four intersections, and no one of the four intersections is preferred in that respect.

FIGURE 13 shows still another alternative embodiment 130 which utilizes a conductive piece 115′ having an aperture 116′ which may be considered to be a superimposition, or combination of the substantially X-shaped aperture of FIGURE 12 and the aperture 77 of FIGURES 6 and 7. This arrangement will provide electromagnetic coupling between drive and sense windings 111′ and 112′ respectively, such that an output current $I_0$ induced in the sense winding 112′ will be greater in magnitude than that achievable with the X-shaped aperture 116′ of FIGURE 12. It should be understood that the selected embodiments set forth in the instant application are merely exemplary, and many more possible alternative embodiments may be realized, utilizing the basic principles of the invention simply by combining the aperture configurations with the alignment and disposition of the conductor members.

For example, the embodiment of FIGURE 12*a* may be further modified, by removal of the short arm, to form simply an I-shaped slot over two diagonally aligned intersections. The embodiment of FIGURE 13 may be modified by use of less than all of the projected portions 116′ extending from the central opening **116*b*′ with which they communicate. For example, none, 1, 2, 3 or 4 such projections 116′ may be used to represent a possible 5-level code. FIGURE 11 may be modified by providing a second opening of the type 116′** to overlie the two remaining intersections between drive and sense windings shown in this figure.

It can, therefore, be seen that the instant invention provides the semi-permanent memory having access speeds far superior to prior art devices wherein a memory card consisting a merely a conductor piece may be interpreted by a simple conductor matrix which develops electrical signals representative of the data stored in such eddy cards.

Although this invention has been described with respect to preferred embodiments thereof, it should be understood that many variations and modifications will now be obvious to those skilled in the art, and it is preferred, therefore, that the scope of the invention be limited not by the specific disclosure herein but only by the appended claims.

What is claimed is:

1. Means for converting a stored data into electrical signals comprising a drive winding, a sense winding positioned adjacent said drive winding at an angle to provide only negligible electromagnetic coupling therebetween; both of said windings being substantially free from the influence of any other electromagnetic fields;
   - said drive and sense windings each being comprised of a pair of spaced parallel lines windings aligned transverse to one another to form four intersections with one another;
   - a first end of each of said windings being short-circuited;
   - a second end of each of said windings being adapted for connection to peripheral circuitry;
   - said drive and sense windings both lying substantially within a common plane; said four intersections defining a planar rectangular shaped region;
   - a memory means being a substantially flat conductive plate positioned immediately above and electrically insulated from the intersection of said drive and sense windings and capable of producing circulating eddy currents in said plate in the presence of a time varying current in said drive winding;
   - the dimensions of said conductive plate being much greater than said planar rectangular shaped region to prevent electromagnetic coupling between said drive and sense windings;
   - said conductive plate having a first aperture positioned adjacent said intersecting windings, said first aperture having a configuration for electromagnetically coupling said drive and sensing windings;
   - said first aperture being an elongated substantially rectangular shaped opening positioned above one of said four intersections and being diagonally aligned therewith;
   - said conductive plate being further provided with second and third elongated substantially rectangular shaped slots being diagonally aligned with two of the remaining three intersections; said first and third apertures being joined at a point above the region enclosed by said four intersections to form a substantially T-shaped slot;
   - the first, second and third arms of said slot each being positioned above an associated one of said four intersections and being diagonally aligned therewith.

2. Means for converting stored data into electrical signals comprising a drive winding, a sense winding positioned adjacent said drive winding at an angle to provide only negligible electromagnetic coupling therebetween; both of said windings being substantially free from the influence of any other electromagnetic fields;
   - said drive and sense windings each being comprised of a pair of spaced parallel lines aligned transverse to one another to form four intersections with one another;
   - a first end of each of said windings being short-circuited; a second end of each of said windings being adapted for connection to peripheral circuitry;
   - said drive and sense windings both lying substantially within a common plane;
   - said four intersections defining a planar rectangular shaped region;
   - a memory means being a substantially flat conductive plate positioned immediately above and electrically insulated from the intersection of said drive and sense windings and capable of producing circulating eddy currents in said plate in the presence of a time varying current in said drive winding;
   - the dimensions of said conductive plate being much greater than said planar rectangular shaped region to prevent electromagnetic coupling between said drive and sense windings;
   - said conductive plate having a first aperture positioned adjacent said intersecting windings, said first aperture having a configuration for electromagnetically coupling said drive and sensing windings;
   - said first aperture being an elongated substantially rectangular shaped opening positioned above one of said four intersections and being diagonally aligned therewith;
   - said elongated rectangular shaped slot being extended to a length sufficient to overlie two diagonally opposite intersections.

References Cited

UNITED STATES PATENTS 3,102,999 9/1963 Bernemyr et al. ______ 340—173
3,176,275 3/1965 Gribble et al. _______ 340—173

OTHER REFERENCES

Card Capacitor—A Semi Permanent, Read Only Memory, by Foglia in the IBM Journal, January 1961, pp. 67 and 68.

Eddy Card Memory—A Semipermanent Storage by Ishidate et al., 1961, Proc. E.J.C.C., pp. 194–198 relied on.

TERRELL W. FEARS, *Primary Examiner.*